US009362610B2

(12) United States Patent
Chinn

(10) Patent No.: US 9,362,610 B2

(45) Date of Patent: Jun. 7, 2016

(54) QUICK ANTENNA ATTACHMENT SYSTEM

(71) Applicant: Ferno-Washington, Inc., Wilmington, OH (US)

(72) Inventor: Robert Chinn, Cummings, GA (US)

(73) Assignee: Ferno-Washington, Inc., Wilmington, OH (US)

( * ) Notice: Subject to any disclaimer, the term of this patent is extended or adjusted under 35 U.S.C. 154(b) by 0 days.

(21) Appl. No.: 14/378,361

(22) PCT Filed: Feb. 14, 2013

(86) PCT No.: PCT/US2013/026129

§ 371 (c)(1),
(2) Date: Aug. 13, 2014

(87) PCT Pub. No.: WO2013/123180

PCT Pub. Date: Aug. 22, 2013

(65) Prior Publication Data

US 2015/0194722 A1 Jul. 9, 2015

Related U.S. Application Data

(60) Provisional application No. 61/598,569, filed on Feb. 14, 2012.

(51) Int. Cl.

*F16M 13/00* (2006.01)
*H01Q 1/08* (2006.01)
(Continued)

(52) U.S. Cl.

CPC ............. *H01Q 1/088* (2013.01); *H01Q 1/1207* (2013.01); *H01Q 1/32* (2013.01)

(58) Field of Classification Search

CPC ....... H01Q 1/088; H01Q 1/1207; H01Q 1/32; H01Q 1/3258; H01Q 1/3266; H01Q 1/3275; H01Q 1/3283; H01Q 1/325; H01Q 1/084

USPC .......................................................... 248/523

See application file for complete search history.

(56) References Cited

U.S. PATENT DOCUMENTS

| | | | |
|---|---|---|---|
| 269,985 | A | 1/1883 | Adgate |
| 619,174 | A | 2/1899 | Haskins |

(Continued)

FOREIGN PATENT DOCUMENTS

| | | | |
|---|---|---|---|
| DE | 2000967 | B | 7/1971 |
| DE | 3209092 | A1 | 9/1983 |

(Continued)

OTHER PUBLICATIONS

International Search Report and Written Opinion pertaining to International Application No. PCT/US2010/041724 dated Nov. 3, 2011.

(Continued)

*Primary Examiner* — Brian Mattei

(74) *Attorney, Agent, or Firm* — Dinsmore & Shohl LLP

(57) ABSTRACT

An antenna mounting system includes an antenna mount and a track. An antenna is secured in the antenna mount and the antenna mount is secured to a track. The track is secured to a structure or vehicle and allows for multiple positioning of the antenna on the structure or vehicle. The antenna mount has multiple, standardized studs attached to the bottom surface of the antenna mount which allows the antenna mount to be secured to the track. One or more antennas may be secured to the structure or vehicle with one or more antenna mounts on one or more tracks.

12 Claims, 9 Drawing Sheets

(51) Int. Cl.
*H01Q 1/12* (2006.01)
*H01Q 1/32* (2006.01)

(56) References Cited

U.S. PATENT DOCUMENTS

| | | | |
|---|---|---|---|
| 716,852 A | 12/1902 | Baker | |
| 1,178,360 A | 4/1916 | Tudor | |
| 1,263,918 A | 4/1918 | Miller | |
| 1,288,010 A | 12/1918 | Isaac | |
| 1,576,034 A | 3/1926 | Butt | |
| 1,702,937 A | 2/1929 | Friedemann | |
| 1,817,962 A | 8/1931 | Breuer | |
| 2,391,051 A | 12/1945 | Windsor | |
| 2,456,024 A | 12/1948 | Schofield | |
| 2,473,364 A | 6/1949 | Dickinson et al. | |
| 2,480,322 A | 8/1949 | Cozzoli | |
| 2,556,076 A | 6/1951 | Evans et al. | |
| 2,644,591 A | 7/1953 | McMahan | |
| 2,685,912 A | 8/1954 | Evans et al. | |
| 2,688,504 A | 9/1954 | Parker | |
| 3,042,221 A | 7/1962 | Rasmussen | |
| 3,204,998 A | 9/1965 | Stollenwerk | |
| 3,358,300 A | 12/1967 | Smith | |
| 3,375,936 A | 4/1968 | Kessler | |
| 3,392,848 A | 7/1968 | McConnell et al. | |
| 3,591,121 A | 7/1971 | Parris | |
| 3,605,637 A | 9/1971 | Prete | |
| 3,606,619 A | 9/1971 | Stollenwerk | |
| 3,613,900 A | 10/1971 | Chiu | |
| 3,770,234 A | 11/1973 | Fovall | |
| 3,840,265 A | 10/1974 | Stirling et al. | |
| 3,846,944 A | 11/1974 | Lambert | |
| 4,114,947 A | 9/1978 | Nelson | |
| 4,170,335 A | 10/1979 | King | |
| 4,178,032 A | 12/1979 | Hone | |
| 4,210,355 A | 7/1980 | Legueu | |
| 4,230,432 A | 10/1980 | Howell | |
| 4,256,424 A | 3/1981 | Knox et al. | |
| 4,397,432 A | 8/1983 | Resetar | |
| 4,423,817 A | 1/1984 | Monjo-Rufi | |
| 4,425,978 A | 1/1984 | Star | |
| 4,458,864 A | 7/1984 | Colombo et al. | |
| 4,568,050 A | 2/1986 | Radoy et al. | |
| 4,576,319 A | 3/1986 | Brown | |
| 4,602,756 A | 7/1986 | Chatfield | |
| 4,677,794 A | 7/1987 | Parron et al. | |
| 4,763,360 A | 8/1988 | Daniels et al. | |
| 4,853,555 A | 8/1989 | Wheat | |
| 4,915,435 A | 4/1990 | Levine | |
| 4,974,377 A | 12/1990 | Dominitz et al. | |
| 5,007,608 A | 4/1991 | Carroll, Jr. | |
| 5,157,409 A | 10/1992 | Hamin | |
| 5,383,629 A | 1/1995 | Morgan | |
| 5,425,520 A | 6/1995 | Masumoto | |
| 5,490,703 A | 2/1996 | Hewko | |
| 5,615,848 A | 4/1997 | Ceriani | |
| 5,732,965 A | 3/1998 | Willey | |
| 5,738,306 A | 4/1998 | Moss et al. | |
| 5,755,478 A | 5/1998 | Kamiya et al. | |
| 5,779,296 A | 7/1998 | Hewko | |
| 5,785,277 A | 7/1998 | Manning et al. | |
| 5,813,629 A | 9/1998 | Cabrera | |
| 5,850,891 A | 12/1998 | Olms et al. | |
| 5,886,674 A * | 3/1999 | Yoshimi | 343/882 |
| 5,988,409 A | 11/1999 | Gusdorf et al. | |
| 6,157,350 A | 12/2000 | House et al. | |
| 6,241,109 B1 | 6/2001 | Kautz et al. | |
| 6,273,366 B1 | 8/2001 | Sprenger et al. | |
| 6,585,188 B2 | 7/2003 | Alli | |
| 6,618,018 B1 | 9/2003 | Sylvester et al. | |
| 6,945,414 B1 | 9/2005 | Stevens et al. | |
| 7,097,204 B2 | 8/2006 | Jessup et al. | |
| 7,328,926 B1 | 2/2008 | Myers et al. | |
| 7,669,945 B2 | 3/2010 | Blersch et al. | |
| 7,677,400 B2 | 3/2010 | Bayazit et al. | |
| 8,636,154 B2 | 1/2014 | Chinn | |
| 2003/0016185 A1* | 1/2003 | Morooka et al. | 343/895 |
| 2004/0178309 A1 | 9/2004 | Crowley et al. | |
| 2005/0039644 A1 | 2/2005 | Sheahan et al. | |
| 2006/0255221 A1 | 11/2006 | Tseng | |
| 2007/0056921 A1 | 3/2007 | Lo | |
| 2007/0097617 A1 | 5/2007 | Searby et al. | |
| 2008/0023976 A1 | 1/2008 | Myers et al. | |
| 2009/0014584 A1 | 1/2009 | Rudduck et al. | |
| 2009/0140112 A1 | 6/2009 | Carnevali | |
| 2012/0126075 A1 | 5/2012 | Chinn et al. | |
| 2013/0081233 A1 | 4/2013 | Lu | |

FOREIGN PATENT DOCUMENTS

| | | | |
|---|---|---|---|
| DE | 3230905 | A1 | 2/1984 |
| DE | 8910460 | U1 | 10/1989 |
| DE | 19716046 | A1 | 10/1998 |
| EP | 0021526 | A2 | 1/1981 |
| EP | 0105675 | A2 | 9/1983 |
| EP | 0260726 | A2 | 3/1988 |
| EP | 0583491 | A1 | 2/1994 |
| EP | 1863119 | A1 | 12/2007 |
| EP | 2206623 | A1 | 7/2010 |
| EP | 2614804 | A1 | 7/2013 |
| FR | 1085340 | | 1/1955 |
| FR | 2481110 | A1 | 10/1981 |
| FR | 2647323 | A1 | 11/1990 |
| FR | 2649007 | A1 | 1/1991 |
| GB | 1530794 | | 11/1978 |
| GB | 2401541 | A | 11/2004 |
| GB | 2452083 | A | 2/2009 |
| WO | 9115178 | A1 | 10/1991 |
| WO | 9927881 | A1 | 6/1999 |
| WO | 0059466 | A1 | 10/2000 |
| WO | 2006122351 | A1 | 11/2006 |
| WO | 2011006163 | A2 | 1/2011 |

OTHER PUBLICATIONS

International Preliminary Report on Patentability pertaining to International Application No. PCT/US2010/041724 dated Jan. 19, 2012.

Exam Report pertaining to Australian Application No. 2010271194 dated Nov. 27, 2013.

Office Action pertaining to Chinese Application No. 201080038769.2 dated Jan. 24, 2014.

Office Action pertaining to Russian Application No. 2012101216 dated Jul. 29, 2014.

Exam Report pertaining to European Application No. 13163002.2 dated Jun. 13, 2011.

Exam Report pertaining to European Application No. 13163007.1 dated Jun. 11, 2011.

International Search Report and Written Opinion pertaining to International Application No. PCT/US2014/012492 dated Apr. 3, 2014.

International Search Report and Written Opinion pertaining to International Application No. PCT/US2013/026129 dated Apr. 16, 2013.

International Preliminary Report on Patentability pertaining to International Application No. PCT/US2013/026129 dated Aug. 28, 2014.

Exam Report pertaining to Australian Application No. 2013203990 dated Aug. 18, 2014.

International Search Report and Written Opinion pertaining to International Application No. PCT/US2014/015898 dated Jun. 27, 2014.

International Preliminary Report on Patentability dated Aug. 11, 2015 pertaining to International application No. PCT/US2014/012492.

International Search Report and Written Opinion dated Sep. 29, 2015 pertaining to International Application No. PCT/US2014/050392.

Office Action dated Dec. 22, 2015 pertaining to Chinese Patent Application No. 201410247226.1.

Office Action dated Dec. 16, 2015 pertaining to Japanese Patent Application No. 2015-020347.

Non-final Office Action pertaining to U.S. Appl. No. 14/455,471 dated Feb. 11, 2016.

Official Action dated Feb. 29, 2016 pertaining to Egyptian Patent Application No. PCT/NA/50/2012.

(56) References Cited

OTHER PUBLICATIONS

Examination Report dated Mar. 1, 2016 pertaining to European Patent Application No. 14707550.1.

Examination Report dated Feb. 5, 2016 pertaining to European Patent Application No. 14703501.8.

* cited by examiner

QUICK ANTENNA ATTACHMENT SYSTEM

CROSS REFERENCE TO RELATED APPLICATIONS

The present application hereby claims priority under 35 U.S.C. §119(e) to Provisional U.S. Application No. 61/598,569 filed Feb. 14, 2012, entitled "Quick Antenna Attachment and Methods of Their Use."

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

Figure 1:
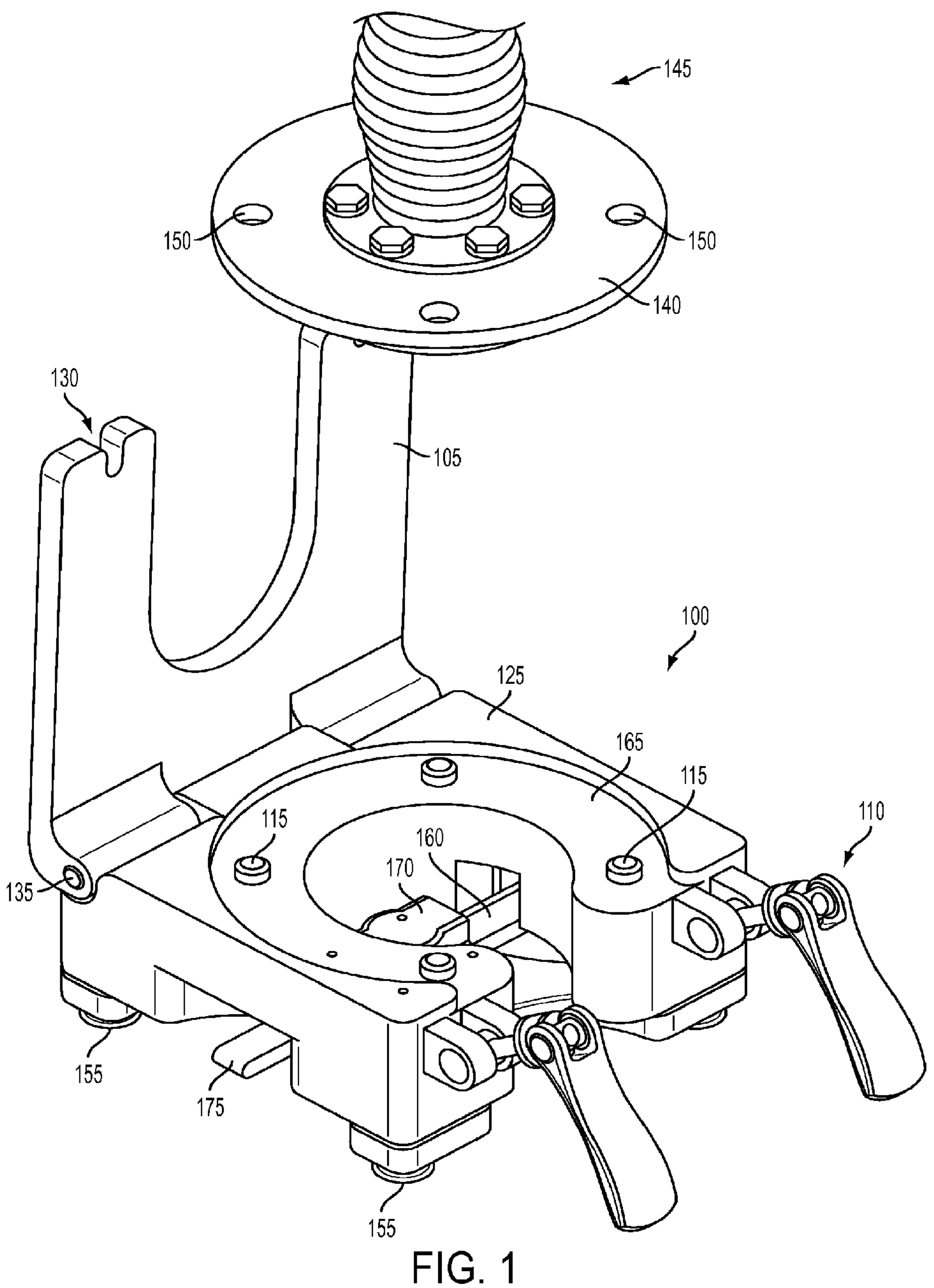
FIG. 1 is a perspective view of an antenna mount.

The embodiments set forth in the drawings are illustrative in nature and not intended to be limiting of the invention defined by the claims. Moreover, individual features of the drawings and the invention will be more fully apparent and understood in view of the detailed description.

SUMMARY

In one embodiment, an apparatus for mounting an antenna to a structure may include a mounting plate and a locking plate coupled to the mounting plate and configured to secure an antenna to the mounting plate. The antenna mount may include a plurality of mounting studs coupled to a bottom surface of the mounting plate and one or more quick releases coupled to the mounting plate and configured to align with one or more notches in the locking plate to secure the locking plate to the mounting plate.

In another embodiment, an apparatus for a mobile repeating station may include a vehicle and one or more antenna mounts. The antenna mount may include a mounting plate and a locking plate coupled to the mounting plate and configured to secure an antenna to the mounting plate. The antenna mount may include a plurality of mounting studs coupled to a bottom surface of the mounting plate and one or more quick releases coupled to the mounting plate and configured to align with one or more notches in the locking plate to secure the locking plate to the mounting plate. The mobile repeating station may also include one or more tracks secured to the vehicle. The track include one or more slots configured to capture and secure the plurality of mounting studs, wherein each slot has a plurality of open regions and a plurality of necked down regions that alternate along each slot.

In yet another embodiment, an apparatus for an antenna mounting system may include a mounting plate and a locking plate coupled to the mounting plate and configured to secure an antenna to the mounting plate. The antenna mount may include a plurality of mounting studs coupled to a bottom surface of the mounting plate and one or more quick releases coupled to the mounting plate and configured to align with one or more notches in the locking plate to secure the locking plate to the mounting plate. The antenna mounting system may also include one or more tracks secured to a structure. The track include one or more slots configured to capture and secure the plurality of mounting studs, wherein each slot has a plurality of open regions and a plurality of necked down regions that alternate along each slot.

The antenna mounting system may also include one or more antennas where the one or more antennas are secured in one or more antenna mounts and attached to the one or more tracks at differing locations around the structure.

DETAILED DESCRIPTION

The following text sets forth a broad description of numerous different embodiments of the present invention. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). No term is intended to be essential to the present invention unless so stated. To the extent that any term recited in the claims at the end of this patent is referred to in this patent in a manner consistent with a single meaning, that is done for sake of clarity only so as to not confuse the reader, and it is not intended that such a claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

FIG. 1 is a perspective view of an antenna mount 100. In one exemplary embodiment, the antenna mount 100 comprises a locking plate 105 coupled to a mounting plate 125. As a non-limiting example, the locking plate 105 may be coupled to the mounting plate 125 via a hinge 135, a plurality of button snaps, a slide lock, friction lock, a barrel hinge, or a ball and socket. The locking plate 105 has a notch 130 in two places to allow one or more quick releases 110 to secure the locking plate 105 to the mounting plate 125. The mounting plate 125 has a recessed footprint 165 with one or more index pins 115. An antenna 145 comprising an antenna base 140 with one or more index holes 150 is shown in FIG. 1. The recessed footprint 165 is in the outline of the antenna base 140 with the index pins 115 lining up with the index holes 150. The mating of the index pin 115 with the index holes 150 constrains the rotational movement of the antenna 145. The mounting plate 125 incorporates a left locking pin release 175, a right locking pin release 160 and the release mechanism 170.

In this embodiment, the antenna base 140 rests in the recessed footprint 165 with the index pins 115 lining up with their corresponding index holes 150 such that the index pins 115 insert into the index holes 150. The locking plate 105 closes over the antenna base 140 and is secured in place with one or more quick releases 110. Through securing, for example as shown in FIG. 1, the two quick releases 110, the antenna mount 100 becomes one with the antenna 145 and secures the antenna 145 to whatever structure the mounting plate 125 is attached to. The structure may be a wall, a floor, a ceiling, a roof, a building system, a vehicle, or furniture. The building system may be the frame of the building, doors, or any associated structure of the building. The mounting plate 125 may be secured to furniture such as, for example, a table, a shelf, a desk, or a chair. The mounting plate 125 is secured through the use of mounting studs 155. When the release mechanism 170 is activate via the left locking pin release 175 or the right locking pin release 160, the locking pin 500 (not shown) retracts into the mounting plate 125 and allows the antenna mount 100 to be removed from its secured location. It should be understood that the recessed footprint 165 can be of any shape or size to accommodate the base of any antenna wanted to be secured by the antenna mount 100. Furthermore, the mounting plate 125 and the locking plate 105 can be of any shape or size to accommodate securing any antenna desired to be secured.

Figure 2:
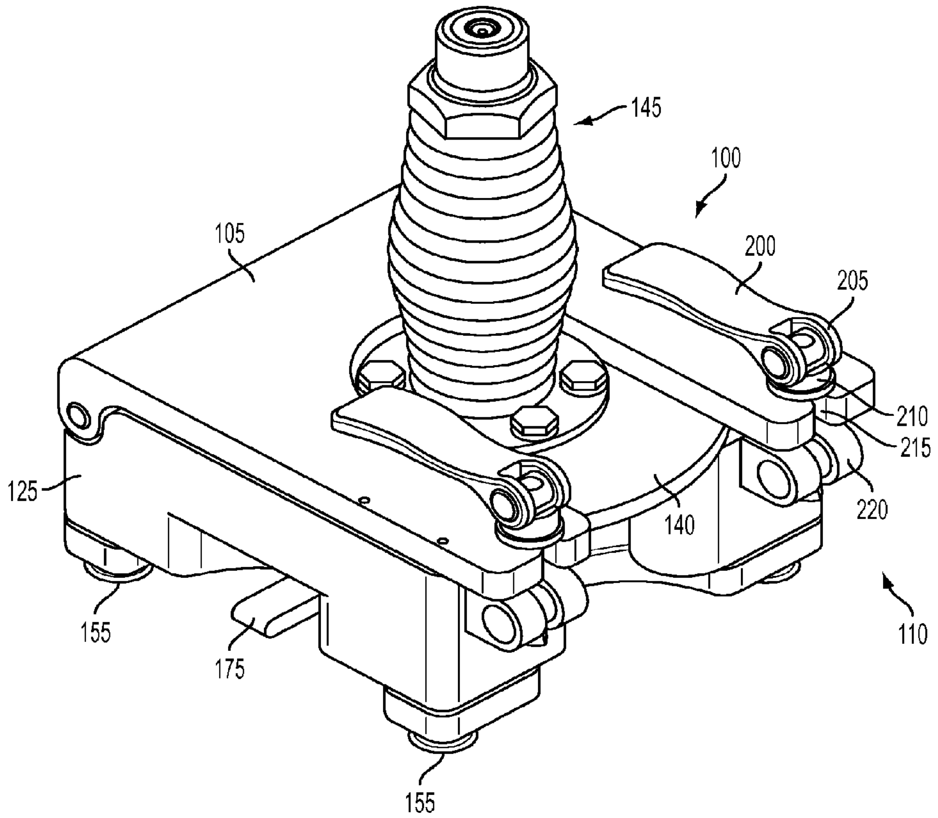
FIG. 2 is a perspective view of an antenna mount fully assembled.

FIG. 2 is a perspective view of the antenna mount 100 fully assembled encapsulating the antenna 145. The antenna base 140 is held in place between the locking plate 105 and the mounting plate 125 by two quick releases 110. The quick releases 110 can be a cam clamp with a hinge 220, threaded rod 215, release press 210, release cam 205 and a release lever 200. The release cam 205 is not round but oblong to increase the amount of force on the release press 210 as the release lever 200 is moved to its final position. Once the release press 210 is pivoted above the locking plate 105, the release lever 200 is moved to its final position (shown in FIG. 2) and the release cam 205 exerts force on the release press 210 which in turn presses the locking plate 105 against the mounting plate 125, securing the locking plate 105 and in turn the antenna 145 in place. It should be understood that the quick releases 110 may be a clamp, a toggle clamp, a cam clamp, an elastic band, a bolt and nut, or an electric locking mechanism. The electric locking mechanism may provide the force necessary to secure the locking plate to mounting plate using one of the above mentioned mechanisms without the need for a user to intervene.

Figure 3:
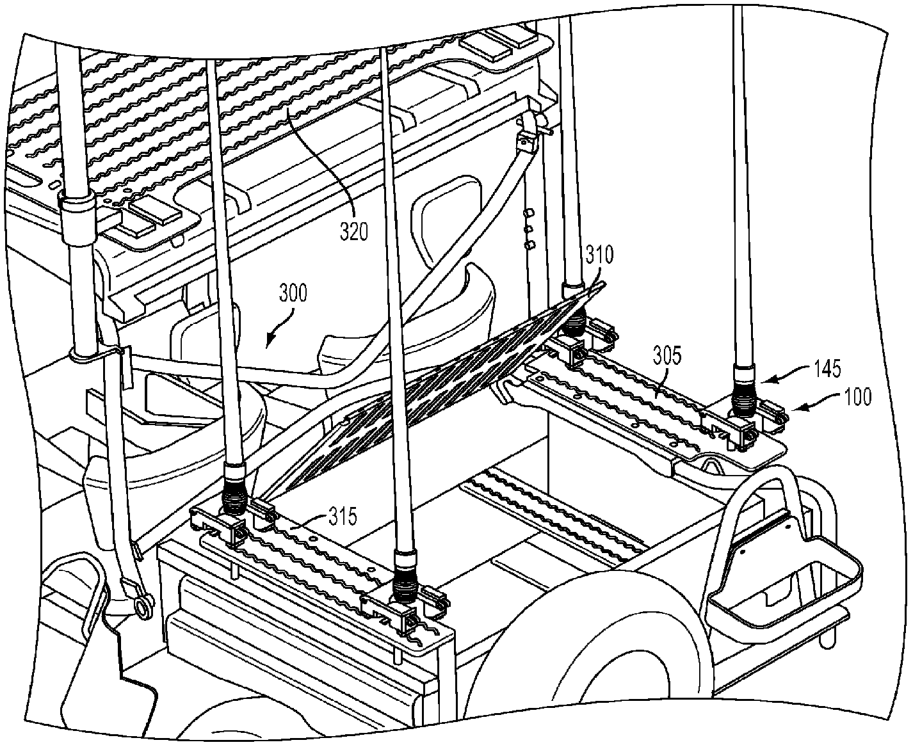
FIG. 3 is a perspective view of an track system installed on a vehicle with an antenna mount and antenna.

FIG. 3 is a perspective view of the track system installed on a vehicle 300 with the antenna mount 100 and antenna 145. In FIG. 3, the flexibility of the system is shown in that the vehicle has a right track 305, a hinge track 310, a left track 315 and a roof track 320. The antenna mount 100 is able to attach on any of the track surfaces thereby allowing the antenna 145 to be placed in any ideally suited location and not be constrained by the mounting surfaces of the vehicle 300.

Figure 4:
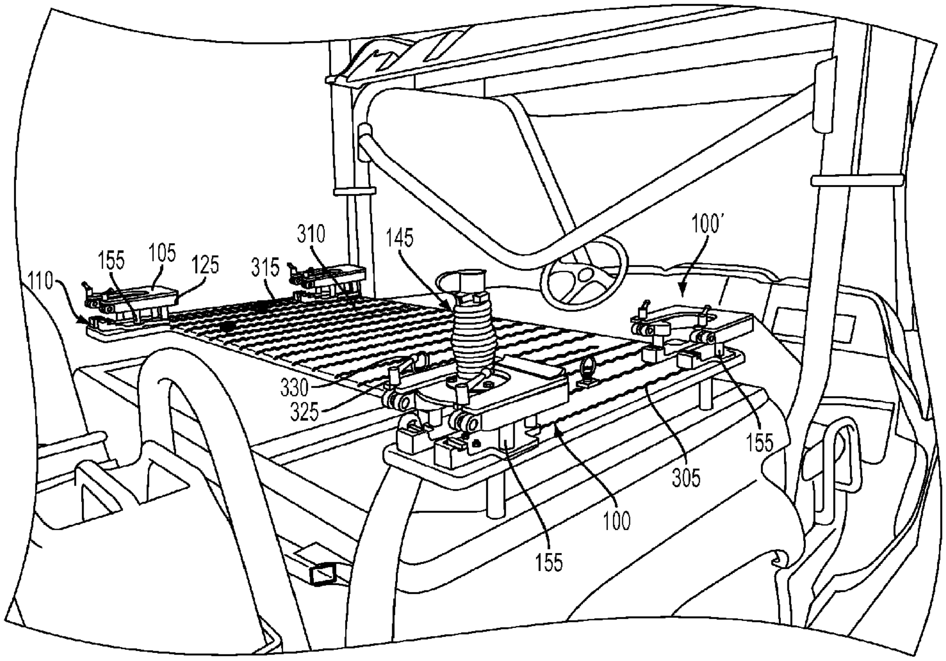
FIG. 4 is another perspective view of a track system of FIG. 3.

FIG. 4 is another perspective view of the track system installed on a vehicle 300 with the antenna mount 100 and antenna 145. The antenna 145 and antenna mount 100 is attached to the track surfaces (i.e. right track 305, hinged track 310, left track 315) by the mounting studs 155. An empty antenna mount 100 is shown with the locking plate 105 pressed against the mounting plate 125 by the quick releases 110. It should be noted that the quick releases 110 shown in this figure are another embodiment with a cap nut 325 and a cap arm 330. The cap arm 330 provides a mechanical advantage to quickly tighten the cap nut 325 once it is swung into position over the locking plate 105.

Figure 5:
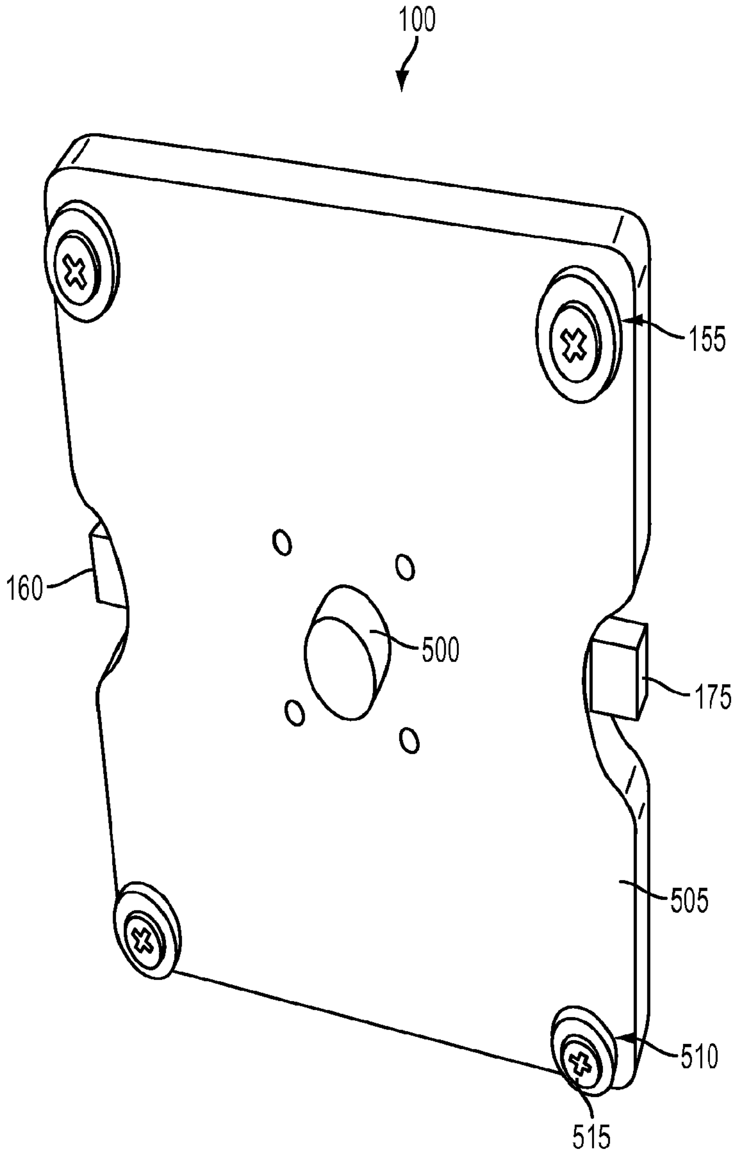
FIG. 5 is a bottom view of an illustrative mounting bracket.

FIG. 5 is a bottom view of the exemplary antenna mount 100. The antenna mount 100 has a bottom surface 505 and four mounting studs 155. Each mounting stud 155 includes a stem portion 510 and an enlarged head portion 515. A locking pin 500 may be biased (e.g., by a spring) outward towards an extended, lock position for engaging the associated track. The locking pin 500 may be retracted using either individually or in combination one or more licking pin releases, for example the right locking pin release 160 or the left locking pin release 175 which is operatively connected to the release mechanism 170. It should be understood that the locking pin releases could be oriented in any direction to allow the released of the mount around any obstruction. Furthermore to release the mount, two or more release levers may need to be actuated. Such an embodiment may provide for additional security by preventing unwanted movement of the mounting bracket when a single lever is accidentally actuated.

Figure 6:
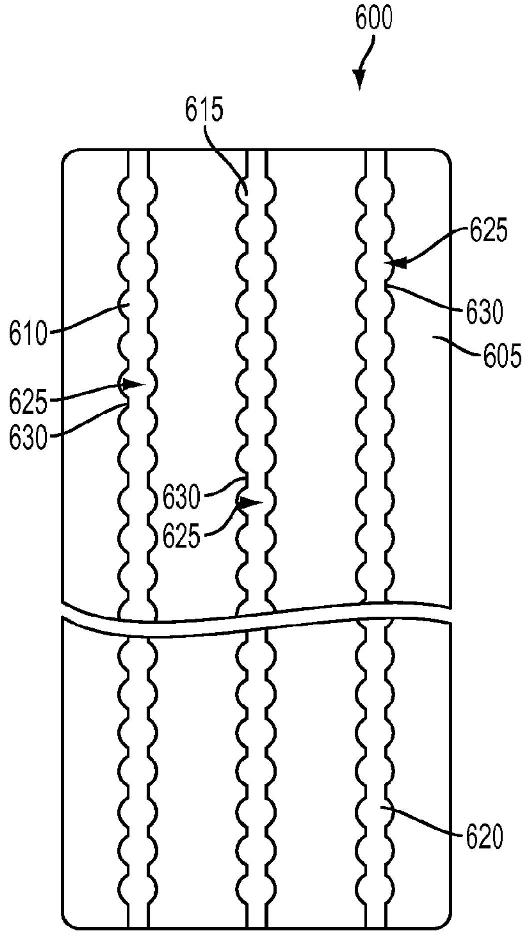
FIG. 6 is a front view of a track.
Figure 7:
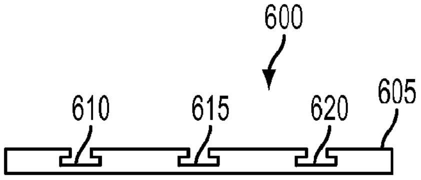
FIG. 7 is an end view of the exemplary track of FIG. 6.

Referring to FIGS. 6 and 7, an exemplary embodiment of a track 600 for use in the track system or similar track system is illustrated. While four or more tracks 600 may be used in the track system as illustrated by FIG. 3 and FIG. 4 (i.e. right track 305, hinged track 310, left track 315), only one track will be described as multiple tracks of the same track system may have the same or substantially the same features. The track 600 includes a backing plate 605 that may have an elongated, rectangular shape (or any other suitable shape) and one or more slots 610, 615, and 620 extending along the length of the backing plate and substantially parallel to each other. For example, as shown in FIGS. 6 and 7, there may be three slots, a left slot 610, a center slot 615, and a right slot 620. Each slot 610, 615 and 620 may have a plurality of open regions 625 that are adjacent to a plurality of necked-down regions 630. The plurality of open regions 625 and the plurality of necked down regions 630 alternate along each slot 610, 615, and 620. The enlarged head portions 515 of the mounting studs 155 from FIG. 5 are sized to be received through the open regions 625 and to be captured behind necked-down regions 630 of the slots, 610, 615, 620 while the stem portions 510 are sized to pass by the necked-down regions 630 of the slots 610, 615, 620. The antenna mount 100 matedly couples with the track 600. In some embodiments, the open regions 625 are symmetrical such that they are spaced equidistant apart and are aligned in widthwise rows along the length of the backing plate 605. As another example, the open regions 625 of one or more of the slots 610, 615 and 620 may not all be equidistant and/or may not be aligned in rows with the other open regions of the other slots.

Figure 8:
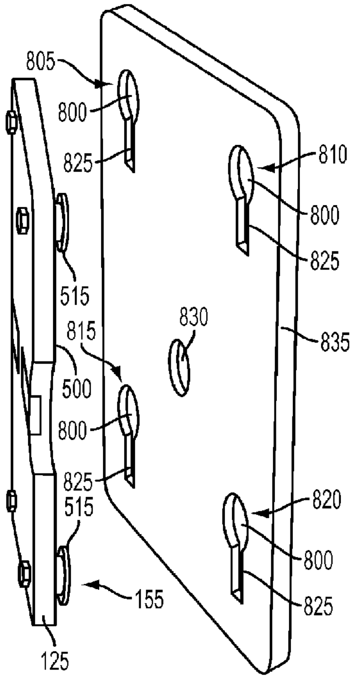
FIGS. 8 and 9 illustrate interaction between the mounting bracket of FIG. 5 and the mounting track of FIG. 6.
Figure 9:
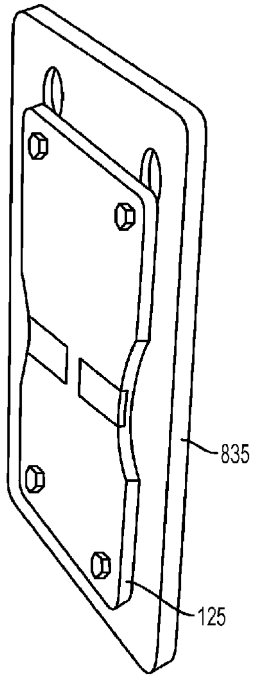

FIGS. 8 and 9 illustrate interaction between the mounting bracket of FIG. 5 and the mounting track of FIG. 6. In FIG. 8, the enlarged head portions 515 are inserted into the enlarged head opening 800 of the keyhole slots 805, 810, 815, 820 disposed on a mount 835, which may retract the locking pin 500. Referring to FIG. 9, the mounting plate 125 may then be moved in a downward direction to place the enlarged head portions 515 behind the necked-down portions 825 and to extend the locking pin 500 into the locking pin opening 830 thereby locking the mounting plate 125 to the mount 835. In some embodiments, the mount 835 may be fixedly mounted to a wall along with other mounts 835 to provide the mounting structure for a tracked surface. As will be described in greater detail below, the enlarged head portions 515 are sized to be received through enlarged head opening keyhole slots 805,

810, 815, 820 and to be captured behind necked-down portions 825 of the slots, while the stem portions 510 (not shown) are sized to pass by the necked-down portions 825 of the slots.

Figure 10:
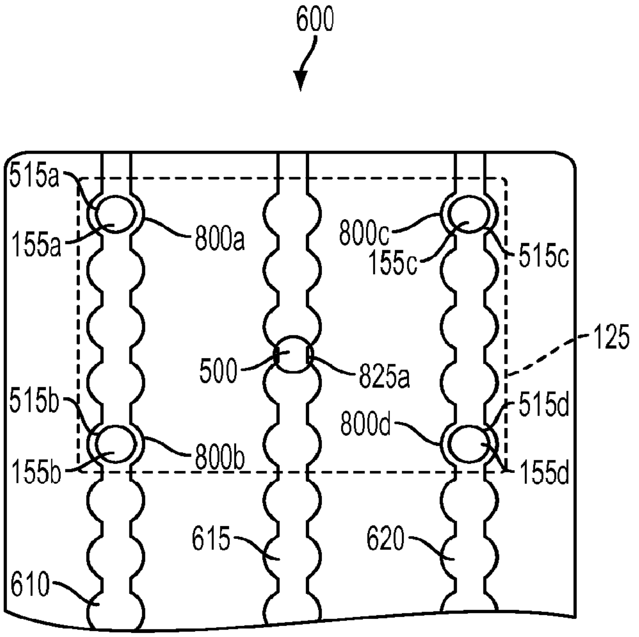
FIGS. 10 and 11 illustrate interaction between the mounting bracket of FIG. 5 and the mounting track of FIG. 6.
Figure 11:
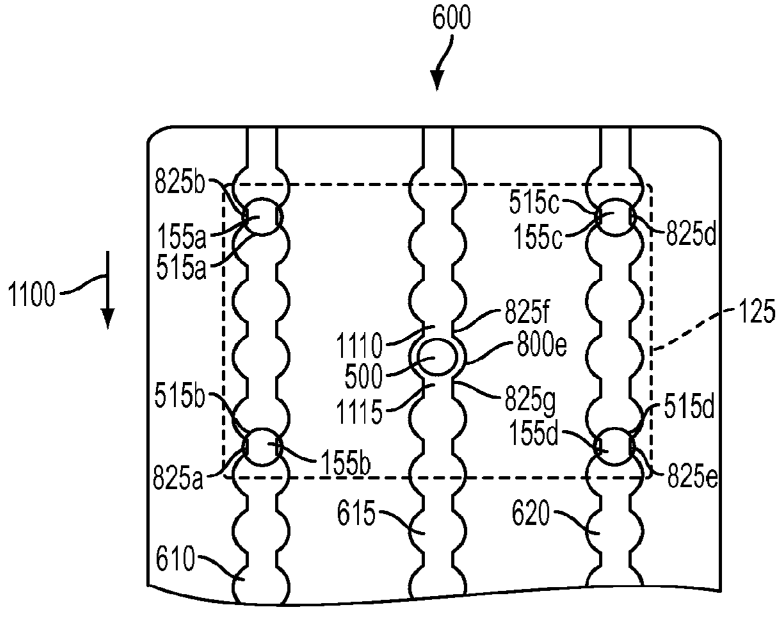

Referring to FIGS. 10 and 11, the track 600 and the mounting plate 125 provide an out-of-phase configuration that is used to lock the mounting bracket to the track. Referring to FIG. 10, when the enlarged head portions 515*a*, 515*b*, 515*c* and 515*d* of the mounting studs 155*a*, 155*b*, 155*c* and 155*d* of the mounting plate 125 are inserted within the enlarged head opening 800*a*, 800*b*, 800*c* and 800*d* of the slots 610 and 620, the locking pin 500 is prevented from entering the slot 615 due to its alignment with the necked-down portion 825*a*. In some embodiments, placing the enlarged head portions 515*a*, 515*b*, 515*c* and 515*d* in the slots 610 and 620 causes the locking pin 500 to retract from its outwardly biased, extended position. Referring to FIG. 11, the stem portions 510 (not shown) of the mounting studs 155*a*, 155*b*, 155*c* and 155*d* are sized to slide through the necked down region 825 while the enlarged head portions 515*a*, 515*b*, 515*c* and 515*d* remain in the slots 610 and 620. Movement of the mounting plate 125 downwardly in the direction of arrow 1100 aligns the enlarged head portions 515*a*, 515*b*, 515*c* and 515*d* with necked-down portion 825*b*, 825*c*, 825*d* and 825*e* of the slots 610 and 620 and aligns the locking pin 500 with the enlarged head opening 800*e* of the slot 615. The width of the locking pin 500 may be greater than the upper passageway 1110 and the lower passageway 1115 through the necked-down portion 825*f* and 825*g* adjacent the enlarged head opening 800*e*, which prevents further movement of the mounting plate 125 once the locking pin 500 passes through the enlarged head opening 800*e* and into the slot 615. In embodiments where the locking pin 500 is biased toward its extended position, the locking pin 500 may snap into its extended position automatically once the locking pin 500 is aligned with the enlarged head opening 800*e*. An operator can retract the locking pin 500 out of the slot 615 by actuating any of the locking pin releases 160/175 described above and again move the mounting plate 125 along the track 600 to a different elevation.

While FIGS. 10 and 11 illustrate a mounting plate 125 being secured to the track 600 using four mounting studs 155*a*, 155*b*, 155*c*, and 155*d* and one locking pin 500, it should be appreciated that any other number of studs and locking pins may alternatively be employed. Such an embodiment may allow for a secured connection under increased loads by providing more points of contact between the mounting plate 125 and the track 600. In another embodiment, the mounting plate 125 may incorporate eight studs 155 evenly distributed about the mounting plate 125. In yet another embodiment, any other number of studs 155 may be disposed on the mounting plate 125 that allows for a releasable connection with the track 600. The enlarged head portions 515 are sized to be received through open regions 625 of the slots 610, 615, 620 and to be captured behind necked-down regions 630 of the slots 610, 615, 620, while the stem portions 510 are sized to pass by the necked-down regions 630 of the slots 610, 615, 620.

Figure 12:
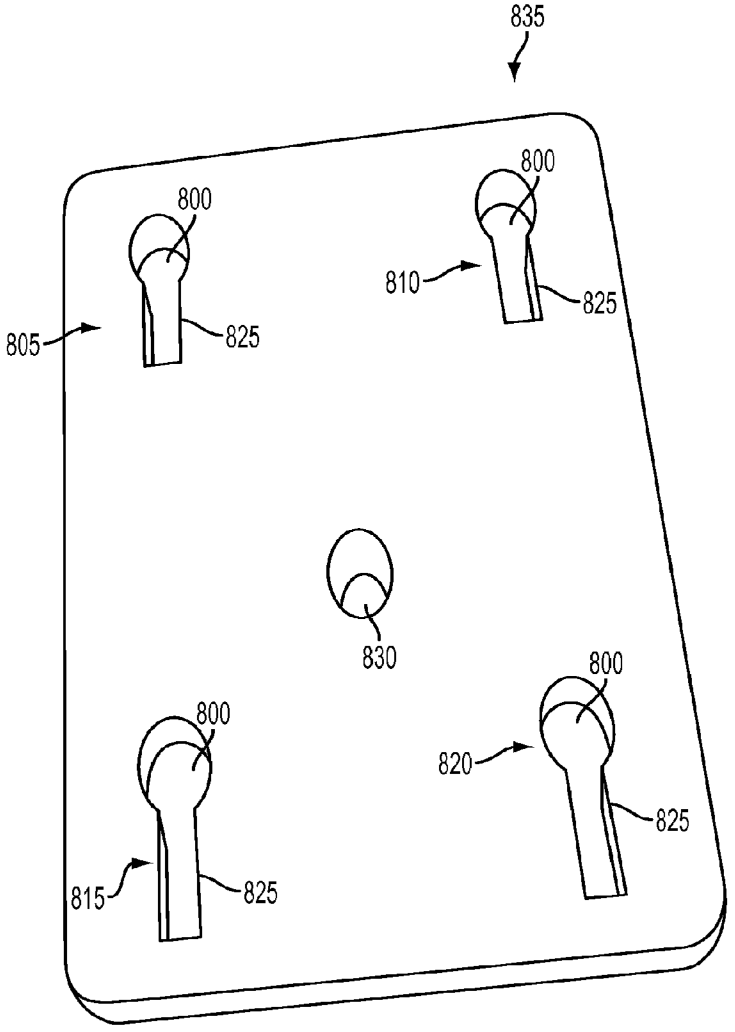
FIG. 12 is a perspective front view of another embodiment of a mounting plate.

FIG. 12 is a perspective front view of an exemplary embodiment of a mount 835, as an alternative to the track 600. The mount 835 may be used to mount the mounting plate 125 (not shown) to a wall. The mount 835 may include any suitable mount structure for mounting to a wall. The mount 835 includes slots in the form of keyhole slots 805, 810, 815 and 820 that have an enlarged head opening 800 and a necked-down portion 825. The enlarged head opening 800 of the keyhole slots 805, 810, 815 and 820 are sized and arranged to receive the enlarged head portions 515 (not shown) therethrough and the necked-down portions 825 are sized to allow the stem portions 510 (not shown) to slide therein with the enlarged head portions 515 captured within the necked-down portions 825. An locking pin opening 830 may be provided that is sized to receive the locking pin 500 (not shown) when the locking pin 500 (not shown) is aligned with the locking pin opening 830.

It will be appreciated that the track system may be modular in that a number of components of the track system may be interchangeable, which can reduce assembly time, complexity, and costs. Such modularity in the track system may allow for a more rapid and fluid response to a particular situations, which may improve the outcomes in some instances. The track system configuration allows its use on a variety of different vehicles and/or other equipment, thus providing the benefit of interchangeability and flexibility. Another benefit of the antenna mount and track systems described herein is that they permit a user to install, remove, and/or reconfigure one or more antennas with little-to-no visibility.

In some embodiments, printed or painted indicia and/or tactile indicia (e.g. a location indicator) may be used along with the track system. For example, a location indicator may be placed alongside or even on the tracks 600. In some embodiments, a marker may be placed on the tracks 600 to allow for rapid adjustments of the antenna mount 100 with little to no visibility. The indicia may be located on the tracks 600 or on the vehicle 300.

The track system can be made out of any material of sufficient strength. It could be made out of one piece of material or a casting. The studs on the mounting plate and the openings on the tracks can be increased or decreased as needed to reach the desired mounting strength required by the equipment and material used in the system's manufacture.

It will be appreciated that this system does not require tools to mount an antenna to a vehicle or other equipment. As set forth above, the ease of its use and installation would allow the mounting of an antenna in either daytime or nightime operations. The antenna mount is designed so that the quick releases can be found in the dark and the antenna can be moved or removed under little-to-zero light conditions. The locking plate is secured in the locked position by two quick releases which can be quickly swung into position and tightened by hand. The quick releases also could be tightened by electro-mechanical means as well. The quick releases are located with sufficient tactile landmarks to facilitate their manual location and operation in zero light conditions. The antenna mount has twin locking pin releases which have totally different shapes so that they can be identified and operated manually in zero light conditions.

This system allows for antenna to be rapidly attached to a vehicle once the vehicle is in a condition to accept the antenna as for example, once the vehicle is off-loaded off of a helicopter. The flexibility of the system allows the antennas to be moved and/or spaced apart from one another to avoid interference with each other and still be attached to the vehicle.

The antenna mount and track system when attached to vehicles such as the vehicle shown in FIGS. 3 and 4, permit conventional vehicles (e.g. all terrain vehicles) to be converted to highly flexible and mobile repeating stations. Unlike conventional mobile repeating stations that only included a very limited number of permanently fixed antenna mounting locations, the antenna mount, track system, and vehicle embodiments shown and described herein provide almost an infinite number of antenna mounting configurations to correspond with a multitude of operational needs. One skilled in the art would know the antenna arrangement for a conventional repeating station and more generally about conventional repeating stations.

Certain terminology is used in the disclosure for convenience only and is not limiting. The words “left”, “right”, “front”, “back”, “top”, “bottom”, “upper”, and “lower” designate directions in the drawings to which reference is made. The terminology includes the words noted above as well as derivatives thereof and words of similar import.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. An antenna mount, comprising:

a mounting plate;

a locking plate coupled to the mounting plate by a hinge such that the locking plate closes over an antenna base of an antenna to secure the antenna base between the locking plate and the mounting plate; and one or more quick releases coupled to the mounting plate and configured to align with one or more notches in the locking plate to secure the locking plate to the mounting plate.

2. The antenna mount of claim 1, further comprising a track configured to be secured to a structure and comprising one or more slots configured to capture and secure a plurality of mounting studs coupled to a bottom surface of the mounting plate, each slot has a plurality of open regions and a plurality of necked down regions that alternate along each slot.

3. The antenna mount of claim 1, further comprising:

a release mechanism wherein the release mechanism is coupled to the mounting plate;

a locking pin wherein the locking pin is coupled to the release mechanism and biased to an extended position through the bottom surface to engage a center slot of one or more slots on a track to stop movement of the mounting plate in relation to the track; and one or more locking pin releases wherein the one or more locking pin releases are coupled to the release mechanism and when actuated, retract the locking pin and allow the mounting plate to move in relation to the track.

4. The antenna mount of claim 1, wherein the mounting plate further comprises:

a recessed foot print that matches the antenna base; and one or more index pins configured to align with one or more index holes in the antenna base.

5. A mobile repeating station, comprising:

a vehicle;

an antenna comprising an antenna base with one or more index holes coupled to the antenna;

an antenna mount comprising:

a mounting plate;

a locking plate coupled to the mounting plate by a hinge such that the locking plate closes over the antenna base to secure the antenna base between the locking plate and the mounting plate;

a plurality of mounting studs coupled to a bottom surface of the mounting plate; and one or more quick releases coupled to the mounting plate and configured to align with one or more notches of the locking plate to secure the locking plate the mounting plate; and one or more tracks secured to the vehicle, the track comprising one or more slots configured to capture and secure the plurality of mounting studs, wherein each slot has a plurality of open regions and a plurality of necked down regions that alternate along each slot.

6. The mobile repeating station of claim 5 wherein one or more antennas are secured in one or more antenna mounts and attached to the one or more tracks at differing locations around the vehicle.

7. The mobile repeating station of claim 5, further comprising:

a release mechanism wherein the release mechanism is coupled to the mounting plate;

a locking pin wherein the locking pin is coupled to the release mechanism and biased to an extended position through the bottom surface to engage a center slot of the one or more slots on the track to stop movement of the mounting plate in relation to the track; and one or more locking pin releases wherein the one or more locking pin releases are coupled to the release mechanism and when actuated, retract the locking pin and allow the mounting plate to move in relation to the track.

8. The mobile repeating station of claim 5, wherein the mounting plate further comprises:

a recessed foot print that matches the antenna base; and one or more index pins configured to align with one or more index holes in the antenna base.

9. An antenna mounting system, comprising:

an antenna mount configured to secure an antenna, the antenna mount comprising:

a mounting plate, a locking plate coupled to the mounting plate by a hinge such that the locking plate closes over an antenna base of the antenna to secure the antenna base between the locking plate and the mounting plate, a plurality of mounting studs coupled to a bottom surface of the mounting plate, and one or more quick releases coupled to the mounting plate and configured to align with one or more notches of a locking plate to secure the locking plate the mounting plate;

a track secured to a structure, the track comprising one or more slots configured to capture and secure the plurality of mounting studs, each slot has a plurality of open regions and a plurality of necked down regions that alternate along each slot; and one or more antennas wherein the one or more antennas are secured in one or more antenna mounts and attached to one or more tracks at differing locations around the structure.

10. The antenna mounting system of claim 9, further comprising:

a release mechanism wherein the release mechanism is coupled to the mounting plate;

a locking pin wherein the locking pin is coupled to the release mechanism and biased to an extended position through the bottom surface to engage a center slot of the one or more slots on the track to stop movement of the mounting plate in relation to the track; and one or more locking pin releases wherein the one or more locking pin releases are coupled to the release mechanism and when actuated, retract the locking pin and allow the mounting plate to move in relation to the track.

11. The antenna mounting system of claim 9, wherein the mounting plate further comprises:

a recessed foot print that matches the antenna base; and one or more index pins configured to align with one or more index holes in the antenna base.

12. The antenna mounting system of claim 9, wherein the structure is selected from the group consisting of a wall, a floor, a ceiling, a roof, a building system, a vehicle, and furniture.

* * * * *